(12) United States Patent
Greiner et al.

(10) Patent No.: US 7,911,999 B2
(45) Date of Patent: Mar. 22, 2011

(54) RADIO-TRANSMISSION SYSTEM AND METHOD OF OPERATION

(75) Inventors: Guenter Greiner, Munich (DE); Ruediger Leschhorn, Geltendorf (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 622 days.

(21) Appl. No.: 11/816,398

(22) PCT Filed: Feb. 6, 2006

(86) PCT No.: PCT/EP2006/001032
§ 371 (c)(1),
(2), (4) Date: May 8, 2008

(87) PCT Pub. No.: WO2006/087118
PCT Pub. Date: Aug. 24, 2006

(65) Prior Publication Data
US 2009/0097424 A1    Apr. 16, 2009

(30) Foreign Application Priority Data

Feb. 15, 2005 (DE) .......... 10 2005 006 909
Jun. 28, 2005 (DE) .......... 10 2005 030 108

(51) Int. Cl.
*H04W 4/00* (2009.01)
(52) U.S. Cl. .......... 370/328; 370/392
(58) Field of Classification Search .......... 370/310, 370/328, 329, 338
See application file for complete search history.

(56) References Cited

U.S. PATENT DOCUMENTS

| 7,756,041 | B2 * | 7/2010 | Whitehill et al. | 370/238 |
| 2003/0058886 | A1 * | 3/2003 | Stanforth et al. | 370/468 |
| 2005/0013275 | A1 * | 1/2005 | Black et al. | 370/329 |

FOREIGN PATENT DOCUMENTS

| DE | 196 51 593 | 6/1998 |
| DE | 198 07 931 | 8/1999 |

(Continued)

OTHER PUBLICATIONS

Digital Message Transfer Device Subsystems, MIL-STD-188-220B, Jan. 20, 1998.*

(Continued)

*Primary Examiner* — Jayanti K Patel
*Assistant Examiner* — Jung Park
(74) *Attorney, Agent, or Firm* — Ditthavong Mori & Steiner, P.C.

(57) ABSTRACT

The invention relates to a radio transmission system comprising a plurality of processing layers for the transmission of data packets between various radio appliances in a radio channel. A first functional unit in a physical radio transmission layer analyses the radio channel and determines the quality (QoC) of the radio channel. A second functional unit in a back-up layer controls the access to the radio channel according to the actual quality (QoC) of the radio channel and the priority of the data packets to be transmitted according to the quality (QoS) of the service carried out by the data packets. A third functional unit in a switching layer controls the switching of the data packets. A control unit then releases the data packets for switching by means of the third functional unit only when the quality (QoS) of the service carried out by the data packets corresponds sufficiently with the quality (QoC) of the radio channel determined in the first functional unit.

16 Claims, 2 Drawing Sheets

FOREIGN PATENT DOCUMENTS

| | | |
|---|---|---|
| EP | 13 18 632 | 6/2003 |
| WO | WO 03/071751 | 8/2003 |

OTHER PUBLICATIONS

International Preliminary Report on Patentability, mailed Jan. 24, 2008.

PCT/EP2006/001032, International Search Report, mailed Jun. 26, 2006.

Fecko M.A. et al., "A success story of formal description techniques: Estelle specification and test generation for MIL-STD 188-220," Computer Communications, Elsevier Science Publishers B.V., Amsterdam, NL, vol. 23, No. 12, Jul. 2000, pp. 1196-1213, ISSN: 0140-3664).

* cited by examiner

RADIO-TRANSMISSION SYSTEM AND METHOD OF OPERATION

This application is a 371 of PCT/EP06/01032 Feb. 06, 2006.

FIELD OF THE INVENTION

The invention, according to various embodiments, relates to a radio-transmission system.

BACKGROUND OF THE INVENTION

For a considerable time now, military communications have been experiencing an unprecedented transformation. In principle, with the technology currently available in the civilian sector, any required information can be accessed from any position on the earth automatically and without human intervention, and any network subscriber can be contacted almost without time delay. The development of the internet is a qualitative and quantitative leap in communications, which was unimaginable even at the beginning of the 1990s. Using this type of communication for military purposes opens up completely new horizons.

Modern, network-centric warfare concepts make information available in an appropriate form and without time delay anywhere where it may be required. Communications systems appropriate for this purpose are already being intensively developed. Such systems are subject to extremely stringent requirements, for example, with regard to mobility, maximum inter-operability (also with civilian authorities (BOS)), transparency of the networks (wire-bound/wireless, PSTN, ISDN, LAN, WAN/radio/fixed-wireless networks, military/civilian), universal accessibility, transmission of information in the combination reconnaissance/navigation/impact: position report, presentation of position, friend/foe identification, sensor data, images from digital cameras, GPS tracking, e-mail, newsflashes, other IP services, spontaneous mobile networking (MANET) and independence from an infrastructure.

The type of communication used by tactical troops is changing at an increasing rate. Hitherto, the application "secure voice link", that is to say, speech encoded and resistant to any possible interference, was the almost exclusive priority.

Nowadays, alongside radiotelephony, there is an increasing desire to link different communicating participants with person-to-person accessibility. This type of cross-linking to form systems demands interoperability of communications technologies and an integration of networks in combined systems.

For reasons of interoperability, the use of internet protocols, e.g. TCP/IP, is necessary for networking data communications. These protocols can be realized using narrowband radio technology, for example, with MIL-STD-188-220 B. This standard specifies the lower protocol levels for an interoperability of tactical radio appliances.

Tactical radio is currently based on channels with 25 kHz bandwidth, over which the conventional gross 16 kbit/s can be transmitted with FEC up to 9.6 kbit/s. The use of standard internet protocols for the realisation of spontaneous mobile networking (MANET) in military radio communications would be a rapid and cost favourable solution. However, this requires data rates within the range of Mbit/s and therefore bandwidths in the MHz range. Accordingly, these cannot be used in the radio channels with a bandwidth of only 25 kHz. In the tactical sector, up to company level, radio appliances with bandwidths within this range have, so far, not been used.

Radio appliances with fast data rates and the associated wide signal bandwidths are subject to the following restrictions with regard to the propagation of the radio signals along the surface of the earth (that is to say, without free-space propagation as in the case of airborne platforms): for effective use, a higher frequency range (225 MHz to 400 MHz, but also up to 2 GHz or above) is advisable. However, the range of radio signals decreases with increasing frequency. Increasing the power of transmission only increases this range to a moderate extent. Eight times the transmission power achieves only double the range.

The required bandwidth is proportional to the desired data rate. However, the range decreases with increasing bandwidth. As a result, if the data rate is increased from 16 kbit/s to 1.6 Mbit/s, the range declines by a factor of approximately 5. A further sacrifice with regard to range must be taken into consideration because wide bandwidths generally demand higher transmission frequencies—since the tactical frequency range from 30 MHz to 88 MHz can no longer be used because of the wide bandwidth and density of packing.

Higher-quality types of modulation require a larger noise margin and therefore achieve a lower range with the same transmission power by comparison with the use of simpler modulation methods. The number of radio appliances required for the necessary radio cover depends to a very considerable degree on the range.

DE 196 51 593 A1 and DE 198 07 931 relate to the optimization of these parameters.

Broadband radio appliances for fast data rates are certainly the ideal solution for network communication. However, their radio range is limited. Radio appliances with 25 kHz channels are characterised by moderate data rates, long range and robust modulation methods. Accordingly, they are indispensable in tactical applications. In addition to secure radiotelephony, they can be integrated in current and future data networks with IP-supported protocols such as MIL-STD-188-220 B.

Self-organizing networks with automatic routing can be realized with the MIL-STD-188-220 B, in which applications based on the IP Internet protocol are supported. Accordingly, conventional tactical radio can be expanded for the digital battle-area network, as illustrated in FIG. 1.

The combined hardware/software system 1 guarantees modern internet/intranet communication via different transmission media. The signal management and control system 2 automates radio communication on ships, while the signal management and control system 3 organises radio communication for land-based units. All of the systems 1 to 3 are incorporated in the MANET ad-hoc network 4.

Wire-bound networks and (quasi-stationary) radio networks with fast data rates, such as fixed-wireless networks, differ considerably in their properties from mobile tactical radio networks. Conventionally-used tactical radio appliances currently provide data rates up to a maximum of 16 kbit/s. The new generation of radio appliances recently launched on the market support 72 kbit/s.

Radio appliances with data rates in the order of magnitude of Mbit/s are currently under development. Commercial solutions such as WLAN provide a satisfactory solution only in special cases, because they operate exclusively at a pre-adjusted frequency. The substantial disadvantage of this solution is that it is not protected, for example, against targeted interference. In future, modern broadband-radio appliances, further disadvantages of a single-channel system are avoided by the properties described below, such as adapting the waveform to the varying channel quality.

In mobile applications, the quality and capacity of radio channels is dependent upon the topology and quality of the terrain and on the distance to be bridged.

This means that the available channel capacity can vary between the maximum data rate of a broadband radio appliance of, for example, 2 Mbit/s and that of a narrow-band radio appliance of a few kbit/s. Furthermore, the properties of the radio channels are determined by physical marginal conditions. These include, for example, attenuation, reflection, refraction, diffraction and Doppler shift.

They lead to disturbances in reception, multiple-path propagation and frequency-selective and time-variant fading. The property of the radio channel substantially affected by this is the signal quality, which is described by signal/noise ratio, signal distortion and signal jitter and, derived from these, channel capacity (data rate/bandwidth), bit error rate (BER) and range.

In certain application conditions, especially with relatively-large distances between radio nodes, radio networks can represent so-called "bottlenecks" in the networks. A plurality of measures must be investigated and realized in future networks in order to achieve a satisfactory use of the networks in spite of these temporary, potential restrictions of channel capacity and channel quality resulting from the mobility of the radio networks and their physical properties.

SUMMARY OF THE INVENTION

In accordance with various embodiments of the present invention, a radio-transmission system, which responds flexibly to different requirements of different services to be supported by the radio-transmission system and which reacts flexibly to different qualities of the radio channel, and a method for the operation of this radio-transmission system are provided.

According to various embodiments, a radio-transmission system according to claim 1 is provided, as well as a method for the operation of a radio-transmission system according to claim 12. The dependent claims disclose advantageous further developments of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF THE PREFERRED EMBODIMENTS

With regard to the problem of the time-variant quality and capacity of radio channels, the invention, according to various embodiments, proposes a package involving the follow approaches:
  optimization of the quality and capacity of the individual radio links
  matched and optimized route selection
  selection of appropriate applications and/or matching of applications.

Figure 1:
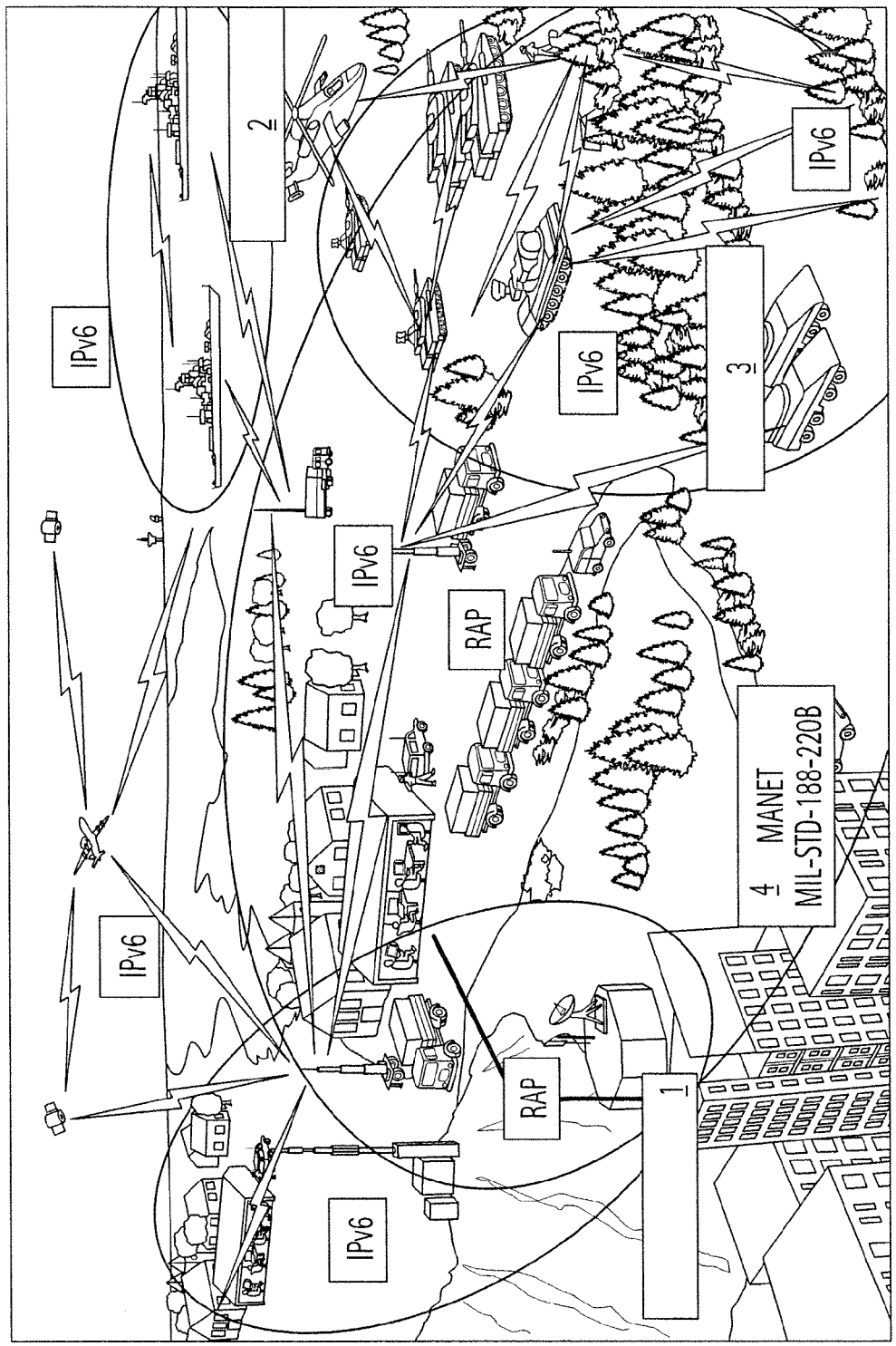
FIG. 1 shows an example of a digital battle-area network according to an exemplary embodiment.
Figure 2:
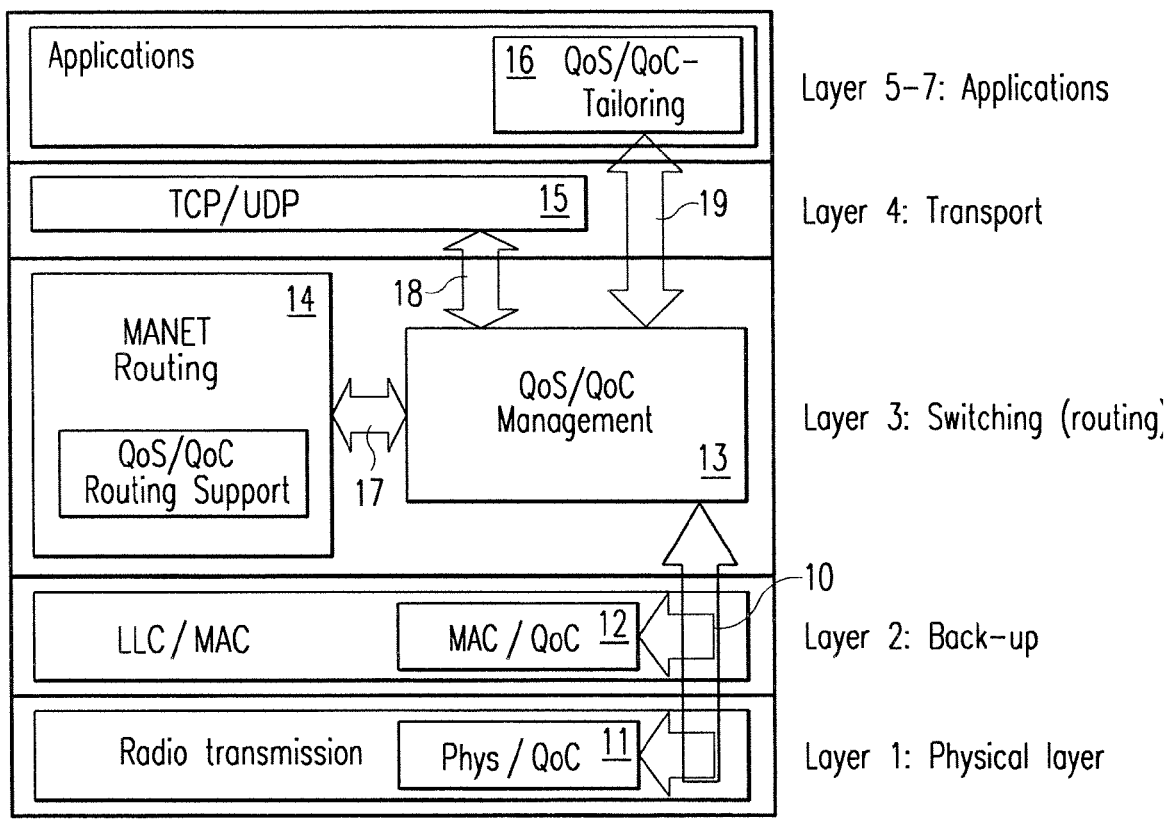
FIG. 2 shows a block circuit diagram of the method according to an exemplary embodiment of the invention.

For this purpose, the approach presented in FIG. 2 involves the area of classical radio technology (layers 1 and 2 of the ISO/OSI layer model) and network technology (layer 3 and above) providing a cooperation between the two areas. An interface, by means of which quality features and, optionally, control data can be exchanged, is provided between these two areas wherein the control data are generated as a response to the quality features exchanged.

Below the interface 10, that is to say, within the classical radio domain, measures (Phys/QoC) must be implemented in block 11 of layer 1 in order to analyze the radio channel and determine corresponding quality features, and to match the radio channels and respectively waveforms by adaptive measures to the respective topographical situation.

By analogy with the Quality of Service (QoS) defined for networks, the quality features for this purpose are referred to as Quality of Channel (QoC). They are processed in the functional block 11 (Phys/QoC).

Functions (MAC/QoC) must be additionally provided in order to control the channel access (Link Management, Slot Multiplexing) and data flow and, in fact, dependent upon the current channel quality and upon the priority of the packets and their requirements with regard to channel quality (Class of Service, CoS). This is implemented in functional blocks 12 (MAC/QoC) of layer 2. The priority of the packets can be determined either in a service-specific and/or user-specific manner. This is also implemented in functional block 12 (MAC/QOC).

Above the QoC-QoS interface 10, that is to say, in the network domain, ways must be found to match the communication with the assistance of these QoC values to the properties of the channels to be used.

The following measures must be adopted in functional block 13 of layer 3 (QoC/QoS-Management):
  sorting the data packets according to priority (MAC/QoC)
  matched queuing (MAC/QoC), that is to say, the formation of queues dependent upon priority
  support of the MANET functions (QoS/QoC Routing Support), for example by:
    range calculation using digitised cards
    connection analysis using exchanged location coordinates
    connection prognoses using velocity vectors of the objects containing the radio stations
    determination of the quality features for the individual links through the radio appliances
    marking of the path qualities in the routing tables
    conversion of the QoC values into the QoS values and matching with IP functionality (matching to TCP/UDP)
    notification of the user regarding the available channel quality and capacity (Qos/QoC Tailoring) and display of the available services
    matching of the applications to the available channel quality and capacity (QoS/QoC Tailoring)

reactions and measures regarding channel capacity, for example, prioritization, data reduction or interruption, which is implemented at the applications level in functional block 16 (QoS/QoC Tailoring).

In order to coordinate the measures below and above the interface 10, the QoC and QoS parameters must be mapped onto one another. This is also required in order to allow a gap-free transition between radio networks and wire-bound networks, that is to say, so that the service features (QoS mechanisms) defined for wire-bound networks can also be implemented in radio networks.

The channel access (Medium Access, MAC), the MANET-Routing in functional block 14 of layer 3 and also the Transport-Protocols TCP/UDP, into which the data in functional block 15 of layer 4 are converted, and the applications of layers 5 to 7 are all affected. Accordingly, the QoC/QoS-mapping must be supplemented with additional functions. This is implemented in a functional block 13 (QoC/QoS-Management). For this purpose, the functional block 13 is connected to functional blocks 14, 15 and 16 via further interfaces 17, 18 and 19.

The function of the radio-transmission system illustrated in FIG. 2 can be explained as follows:

The radio-transmission system has several processing layers for the transmission of data packets between different radio appliances in a radio channel and comprises several functional units and a management unit. The first functional unit 11 is localized in a physical radio transmission layer and analyzes the radio channel in order to determine the quality of the radio channel QoC.

A second functional unit 12 is localized in a data back-up layer and controls access to the radio channel dependent upon the current quality of the radio channel QoC and the priority of the data packets to be transmitted dependent upon the quality QoS of the service realized by the data packets. A third functional unit 14 is localized in a switching layer and controls the switching of the data packets.

A superordinate management unit 13 releases the data packets for switching through the third functional unit 14 only if the quality QoS of the service realized by the data packets corresponds sufficiently with the quality of the radio channel QoC determined in the first functional unit 11, that is to say, if a minimum quality QoC of the radio channel is achieved for quality QoS of the service or respectively service feature of the application.

The management unit 13 is connected to the first functional unit 11 and to the second functional unit 12 via a first interface 10 and to the third functional unit 14 via a second interface 17.

Furthermore, the management unit 13 is preferably connected via a third interface 18 to a fourth functional unit 15 in a transport layer. The fourth functional unit 15 converts the data packets into a corresponding transport protocol, for example, TCP/UDP.

The management unit 13 determines the appropriate transport protocol TCP/UDP on the basis of the quality QoS of the service realized by the data packets and the quality QoC of the radio channel established in the first functional unit 11 and controls the fourth functional unit accordingly.

The management unit 13 is preferably connected via a fourth interface 19 to a fifth functional unit 16 in an applications layer. If the data packets cannot be released for routing by the third functional unit 14, a corresponding message is preferably issued to the user by the fifth functional unit 16. All currently available services can be displayed to the users.

In this context, the management unit 13 controls the third functional unit 14 in such a manner that it makes available through appropriate switching (routing) the transmission capacity of the radio channel required for the respective quality QoS of the service realized by the data packets.

The management unit 13 preferably implements a sorting of the data packets dependent upon the priority required by the respective quality QoS of the service realized by the data packets. The third functional unit for the implementation of the switching of the data packets in this sequence is controlled accordingly.

The management unit 13 can also implement a prognosis of the developing, future quality of the radio channel on the basis of determined velocity vectors of the moving radio appliances.

In summary, the solution can be described as follows: the permanent determination of potential paths (radio paths) of the network (MANET) required for mobile use is supported by intelligent methods. The radio channels are matched by adaptive measures to the respective topographical situation, and the respective channel capacity and channel quality of the individual radio paths are recorded and taken into consideration accordingly in the transport of the data packets. The invention is not restricted to the exemplary embodiment described. All of the features described can be combined with one another as required.

The invention claimed is:

1. Radio-transmission system with a plurality of processing layers for the transmission of data packets between different radio appliances in a radio channel comprising: circuitry configured to provide,
    a first functional unit in a physical radio-transmission layer, which analyzes the radio channel and determines the quality of the radio channel (QoC);
    a second functional unit in a data back-up layer, which controls access to the radio channel dependent upon the current quality (QoC) of the radio channel and the priority of the data packets to be transmitted according to the quality (QoS) of the service realized by the data packets;
    a third functional unit in a switching layer, which controls the switching of the data packets; and
    a management unit, which releases the data packets for switching by the third functional unit only if the quality (QoS) of the service realized by the data packets corresponds sufficiently with the quality (QoC) of the radio channel determined in the first functional unit,
    wherein the management unit is connected via a an interface to a fourth functional unit in a transport layer, and
    wherein the management unit determines a transport protocol on the basis of the quality (QoS) of the service realized by the data packets and the quality (QoC) of the radio channel determined in the first functional unit and controls the fourth functional unit in order to convert the data packets into the corresponding transport protocol.

2. Radio-transmission system according to claim 1, wherein
    the second functional unit in the data back-up layer controls not only the access to the radio channel but also the selection of an appropriate waveform dependent upon the current quality (QoC) of the radio channel and the priority of the data packets to be transmitted according to the quality (QoS) of the service realized by the data packets.

3. Radio-transmission system according to claim 1, wherein
    the management unit is connected to the first functional unit and to the second functional unit via a first interface and to the third functional unit via a second interface.

4. Radio-transmission system according to claim 1, wherein
the management unit is connected via a fourth interface to a fifth functional unit in an application layer.

5. Radio-transmission system according to claim 4, wherein
the management unit determines the transport protocol on the basis of the quality (QoS) of the service realized by the data packets and the quality (QoC) of the radio channel determined in the first functional unit and controls the fourth functional unit accordingly.

6. Radio-transmission system according to claim 4, wherein
if the data packets cannot be released for switching by the third functional unit, the management unit controls the fifth functional unit in such a manner that a corresponding message is issued to the user.

7. Radio-transmission system according to claim 1, wherein
the management unit controls the functional unit in such a manner that it makes available through appropriate switching (routing) the transmission capacity of the radio channel required for the respective quality (QoS) of the service realized by the data packets.

8. Radio-transmission system according to claim 1, wherein
the management unit controls the third functional unit in such a manner that it makes available through appropriate selection of a waveform the transmission capacity of the radio channel required for the respective quality (QoS) of the service realized by the data packets.

9. Radio-transmission system according to claim 1, wherein
the management unit implements a sorting of the data packets according to the priority required by the respective quality (QoS) of the service realized by the data packets and controls the third functional unit to implement the switching of the data packets in this sequence.

10. Radio-transmission system according to claim 1, wherein
the management unit provides a prognosis regarding the developing, future quality of the radio channel (QoC) on the basis of the determined velocity vectors of the moving radio appliances.

11. Method for operating a radio-transmission system with a plurality of processing layers for the transmission of data packets between different radio devices in a radio channel comprising the following procedural stages performed using circuitry:
analysis of the radio channel and determination of the quality (QoC) of the radio channel by means of a first functional unit in a physical radio transmission layer,
control of access to the radio channel dependent upon the current quality (QoC) of the radio channel and dependent upon the priority of the data packets to be transmitted according to the quality (QoS) of the system realized by the data packets by means of a second functional unit in a data back-up layer and
release of the data packets for switching by the third functional unit by means of a management unit, only if the quality (QoS) of the service realized by the data packets corresponds sufficiently to the quality (QoC) of the radio channel determined in the first functional unit,
determination of a transport protocol on the basis of the quality (QoS) of the service realized by the data rackets and the quality (QoC) of the radio channel determined in the first functional unit and
control by means of the management unit of a fourth function unit provided in a transport layer in order to convert the data packets into corresponding transport protocol.

12. Method according to claim 11, wherein
after the analysis of the radio channel, an adaptive matching of the waveform used in the transmission is implemented by selecting an appropriate waveform.

13. Method according to 11, wherein
an issue of a corresponding message to the user by means of a fifth functional unit in an applications layer, if the data packets cannot be released for switching by the third functional unit.

14. Method according to claim 11, wherein
a control of the third functional unit by means of the management unit in such a manner that it makes available by appropriate switching (routing) the transmission capacity of the radio channel required for the respective quality (QoS) of the service realized by the data packets.

15. Method according to claim 11, wherein
a sorting of the data packets by means of the management unit according to the priority required by the respective quality (QoS) of the service realized by the data packets and a control of the third functional unit to implement the switching of the data packets in this sequence.

16. Method according to claim 11, wherein
a provision of a prognosis of the developing, future quality (QoC) of the radio channel on the basis of determined velocity vectors of the moving radio appliances.

* * * * *